US011365156B2

(12) United States Patent
Mulhaupt et al.

(10) Patent No.: US 11,365,156 B2
(45) Date of Patent: Jun. 21, 2022

(54) METHOD FOR PRODUCING A PARTICULATE CARRIER MATERIAL, WHICH IS SHEATHED IN A GRAPHENE-CONTAINING MATERIAL, AND A CERAMIC COMPONENT, AND CERAMIC COMPONENT

(71) Applicant: EagleBurgmann Germany GmbH & Co. KG, Wolfratshausen (DE)

(72) Inventors: Rolf Mulhaupt, Freiberg (DE); Jorg Thomas Thelke, Wolfratshausen (DE); Wenli Zhang, Freiberg (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 114 days.

(21) Appl. No.: 16/628,219

(22) PCT Filed: Jul. 5, 2018

(86) PCT No.: PCT/EP2018/068220
§ 371 (c)(1),
(2) Date: Jan. 2, 2020

(87) PCT Pub. No.: WO2019/008086
PCT Pub. Date: Jan. 10, 2019

(65) Prior Publication Data
US 2020/0148599 A1    May 14, 2020

(30) Foreign Application Priority Data

Jul. 7, 2017  (DE) .................. 10 2017 211 663.3

(51) Int. Cl.
*C04B 35/628*  (2006.01)
*B64G 1/22*   (2006.01)
(Continued)

(52) U.S. Cl.
CPC .......... *C04B 35/62839* (2013.01); *B64G 1/22* (2013.01); *C04B 35/565* (2013.01);
(Continued)

(58) Field of Classification Search
CPC .......... C04B 35/62839; C04B 35/6261; C04B 38/0054; C04B 2235/3826; C04B 2235/422; F16C 33/74; C10N 2040/02
See application file for complete search history.

(56) References Cited

U.S. PATENT DOCUMENTS

2011/0177322 A1* 7/2011 Ogrin ............... B82Y 30/00
                                                   428/325
2012/0058397 A1* 3/2012 Zhamu ............... H01M 4/13
                                                   429/231.8
(Continued)

FOREIGN PATENT DOCUMENTS

CN      106077622 A     11/2016
CN      106128562 A *   11/2016  ............... C09J 9/02
(Continued)

OTHER PUBLICATIONS

International Search Report issued in PCT/EP2018/068220, dated Dec. 17, 2018.
(Continued)

*Primary Examiner* — Noah S Wiese
(74) *Attorney, Agent, or Firm* — Locke Lord LLP; Scott D. Wofsy

(57) ABSTRACT

The invention relates to a sliding member having a first sliding surface, wherein the first sliding surface (29) comprises a particulate support material (6) and a graphene-containing material (7), wherein the particulate support material (6) is at least partially coated with the graphene-containing material (7), and wherein a material bond (14) is (Continued)

present between the particulate support material (6) and the graphene-containing material (7).

13 Claims, 5 Drawing Sheets

(51) Int. Cl.
C04B 35/565 (2006.01)
C04B 35/626 (2006.01)
C04B 35/64 (2006.01)
C04B 38/00 (2006.01)
C10M 103/02 (2006.01)
F16C 33/74 (2006.01)
H01B 1/24 (2006.01)
C10N 40/02 (2006.01)
C10N 50/08 (2006.01)

(52) U.S. Cl.
CPC .......... *C04B 35/6261* (2013.01); *C04B 35/64* (2013.01); *C04B 38/0054* (2013.01); *C10M 103/02* (2013.01); *F16C 33/74* (2013.01); *H01B 1/24* (2013.01); *C04B 2235/3826* (2013.01); *C04B 2235/422* (2013.01); *C04B 2235/6562* (2013.01); *C04B 2235/6567* (2013.01); *C10M 2201/0413* (2013.01); *C10N 2040/02* (2013.01); *C10N 2050/08* (2013.01)

(56) References Cited

U.S. PATENT DOCUMENTS

2017/0074404 A1\* 3/2017 Otschik .................. C04B 41/85
2017/0321057 A1\* 11/2017 Rueger .................. D21H 21/40

FOREIGN PATENT DOCUMENTS

| CN | 106128562 A | 11/2016 | |
|---|---|---|---|
| CN | 106132907 A | 11/2016 | |
| DE | 102014205297 A1 * | 9/2015 | ........... C04B 35/584 |
| DE | 102014018275 A1 * | 6/2016 | ....... C04B 35/62823 |
| DE | 102014018275 A1 | 6/2016 | |
| EP | 3119732 A1 | 1/2017 | |
| WO | 2017/206645 A1 | 12/2017 | |

OTHER PUBLICATIONS

2nd Chinese Office Action, and English translation thereof, dated Mar. 2, 2022, issued during the prosecution of Chinese Patent Application No. 201880045437.3.

\* cited by examiner

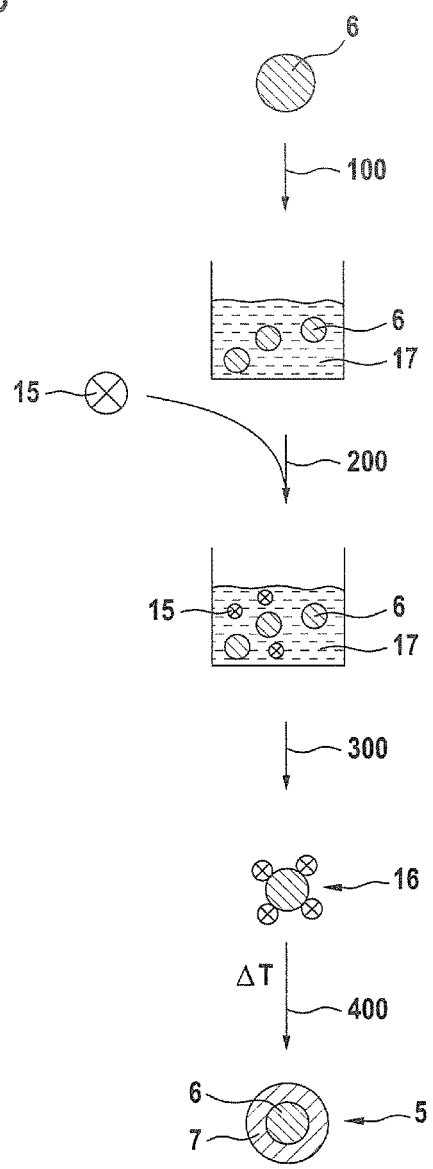

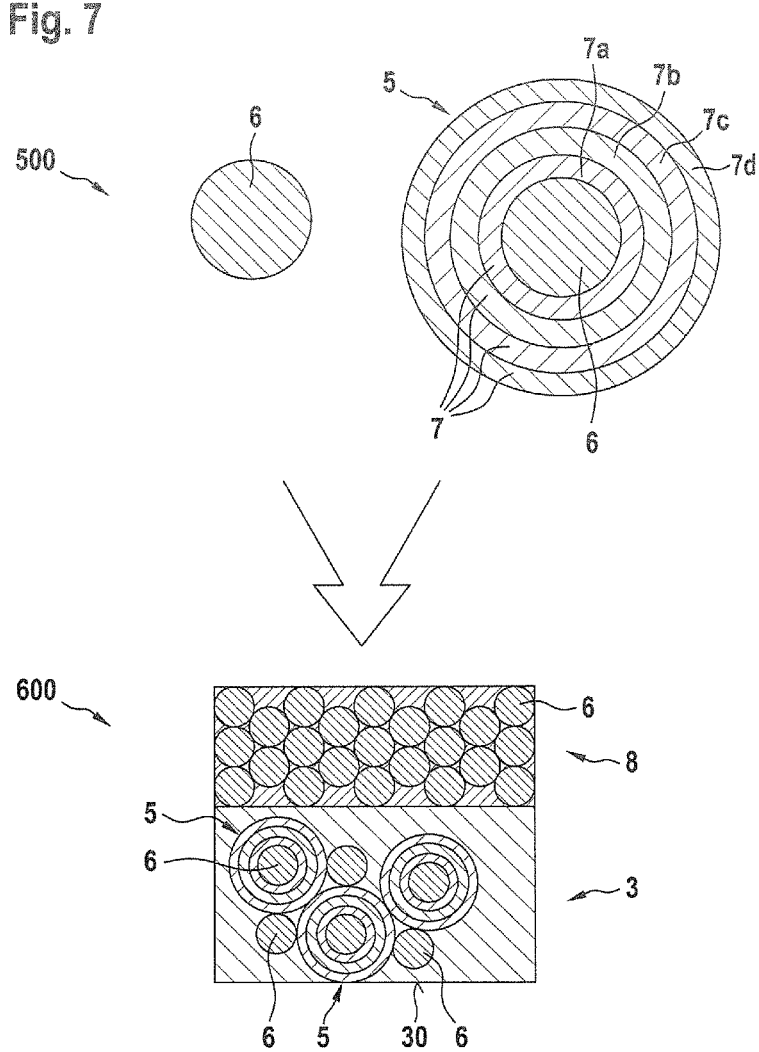

METHOD FOR PRODUCING A PARTICULATE CARRIER MATERIAL, WHICH IS SHEATHED IN A GRAPHENE-CONTAINING MATERIAL, AND A CERAMIC COMPONENT, AND CERAMIC COMPONENT

CROSS REFERENCE TO RELATED APPLICATIONS

This application is a U.S. National Phase Application filed under 35 U.S.C. § 371, based on International PCT Patent Application No. PCT/EP2018/068220, filed Jul. 5, 2018, which application claims priority to German Patent Application No. 10 2017 211 663.3 filed on Jul. 7, 2017. The entire contents of these applications is incorporated herein by reference in their entireties.

The invention relates to a method for the manufacture of a particulate support material coated with a graphene-containing material having electrical conductivity, and a method for the manufacture of a ceramic component. Moreover, the invention also relates to a ceramic component having excellent stability and low abrasion, as well as excellent electrical conductivity.

From prior art, e.g. DE 10 2014 205 297 A1, a mechanical seal is known, which contains SiC as base material supplemented with graphene as a filler. The mechanical seal is characterized by good fracture toughness and flexural strength. The disadvantages thereof are comparatively low hardness and low modulus of elasticity. This reduces abrasion resistance, making the mechanical seal less suitable for use in mechanically and/or thermally impacted systems.

Therefore, it is the object of the invention to provide a ceramic component, especially a sliding member, a mechanical seal and a bearing arrangement or a holder, which are characterized by improved abrasion resistance and hardness, and hence increased stability even under high mechanical and/or thermal impacts. Furthermore, it is an object of the invention to provide a method for the manufacture of a particulate support material coated with a graphene-containing material, as well as a method for the manufacture of a ceramic component, especially a sliding member, which methods are characterized by simple feasibility, wherein in the former method the particulate support material coated with graphene-containing material will be obtained in high yield.

This object will be achieved by a ceramic component according to claim 1 and a method according to claim 13, respectively.

The ceramic component according to the invention having the characteristics of claim 1 has high electrical conductivity, especially greater than $5.3 \times 10^{-3}$ S/cm, and high fracture toughness, each as measured at room temperature (20° C.). The ceramic component comprises a particulate support material and a graphene-containing material. The improved electrical conductivity is obtained in particular when a dopamine-containing carbon source is used as the starting material for the graphene-containing material.

By particulate support material a material is meant that serves as a substrate, i.e. as a base material, for application of graphene-containing material. The particulate support material is in the form of particles which at least partially, and especially completely, are coated with the graphene-containing material.

Within the scope of the present invention, by graphene-containing material a material is understood, consisting, at least partially, of graphene. Preferably, the entire graphene material consists of graphene, except for technically unavoidable residues.

A material bond is present between the particulate support material and the graphene-containing material. This means that a bond is established between the particulate support material and the graphene-containing material wherein the graphene-containing material directly adheres to the surface of the particulate support material. The material bond may be characterized by physical and/or chemical interactions between the particulate support material and the graphene-containing material. Interconnections between graphene and the particulate support material may also be involved in formation of the bond. The material bond between the graphene and the particulate support material provides for permanently good, abrasion-resistant coating with graphene-containing material being present on the top surface of the particulate support material. Furthermore, the ceramic component has at room temperature (20° C.) an electrical resistivity of 1 Ωcm to 100 Ωcm and especially of 20 Ωcm.

Thus, the ceramic component is characterized by high hardness and a high modulus of elasticity, even at high mechanical impacts and high temperatures, which ensures high abrasion resistance of the ceramic component and, at the same time, good sliding properties. Moreover, improved fracture toughness of the ceramic component is achieved.

Advantageous embodiments and further developments of the invention are the subject matter of the subclaims.

According to an advantageous further development, the particulate support material is completely coated with the graphene-containing material. This means that the particle surface of the particulate support material is throughout coated with the graphene-containing material. This may improve abrasion resistance of the ceramic component, especially the sliding member, while maximizing the modulus of elasticity.

Still advantageously, the ceramic component includes a first base body. The base body is to be regarded as a bottom body onto or at which an appropriate sliding surface will be applied or formed, respectively. To improve bonding between the base body and the sliding surface, the first base body exclusively comprises the particulate support material. In other words, this means that the first base body is made of the same particulate support material as the particulate support material coated with graphene-containing material, but which, unlike the particulate support material contained in the first sliding surface, is not coated with graphene-containing material.

Preferably, the ceramic component is a sliding member. For the sake of improved sliding properties and good stability, the entire first sliding surface is preferably formed of the support material coated with the graphene-containing material, or further advantageously, the entire sliding member is formed of support material coated with graphene-containing material, respectively. This may also reduce or even prevent formation of cracks in the graphene-containing material.

For the sake of cost reduction while maintaining good hardness of the ceramic component, it is advantageously provided for the ceramic component to consist of a mixture of particulate support material and particulate support material coated with graphene-containing material.

Still advantageously, a mass ratio of particulate support material and particulate support material coated with graphene-containing material is 80:20 to 99.5:0.5 and in particular of 90:10 to 99.5:0.5. While graphene feedstock being low, a ceramic component having very good abrasion resistance can still be obtained. Thus, the ceramic component may be manufactured at low cost. Furthermore, fracture toughness of a ceramic component, which is made of a mixture of particulate support material and particulate support material coated with graphene-containing material, is preferably increased by a percentage in the range of 5% to 25%, depending on the proportion of the particulate support material coated with graphene-containing material in the mass ratio of the ceramic component. This means e.g. at a mass percentage of the particulate support material coated with graphene-containing material in the range of from 1 to 4% by weight in the ceramic component, fracture toughness thereof increases by at least 10% in relation to that of a ceramic component produced exclusively from the particulate support material, compared with a ceramic component produced exclusively from 100% particulate support material. Fracture toughness is determined, for example, by the SEVNB method (single-edge V-notched beam).

To further improve abrasion resistance of the ceramic component by increasing hardness thereof, a ceramic material will preferably be used as the particulate support material. It has been proven, that ceramic materials, i.e. fired ceramics, are particularly resistant to abrasion even under severe conditions, such as high mechanical and/or thermal impact. Advantageously, the ceramic material will be selected from the group consisting of: SiC, WC, $B_4C$, BN, $Si_3N_4$, $Al_2O_3$, MgO, $ZrO_2$ and any mixtures thereof, wherein SiC is particularly preferred for the reasons of cost.

In view of further improving abrasion resistance of the ceramic component, it is also advantageously provided for the graphene-containing coating to comprise one layer up to 100 layers, in particular one layer up to 20 layers and in particular one layer up to twelve layers of graphene-containing material. The layer structure also allows the tribological properties of the ceramic component, especially the sliding member, to be optimized.

Significant reduction of the potential wear volume of the ceramic component may be achieved by the advantageous further development, wherein the ceramic component contains 6 to 8% macropores by volume, related to the total volume of the ceramic component. In this context, macropores are pores having a pore diameter of 10 to 50 μm in the sense of the present invention. The pore diameter is determined by an LSM method (Laser-Scanning-Microscopy). Preferably, the ceramic component is free of micropores, having a pore diameter of 1 to 10 μm. Free of pores means that there are no micropores between the particulate support material coated with graphene-containing material and any non-coated particulate support material. Thus, density of the ceramic component is optimal, whereby abrasion resistance may also be especially increased while maintaining good sliding properties.

Furthermore, according to the invention, a sliding member, comprising a first sliding surface, which is a ceramic component according to the invention, and especially is a mechanical seal, is also described. The mechanical seal according to the invention comprises a rotating first seal ring with a first sliding surface and a stationary second seal ring with a second sliding surface, which define a sealing gap therebetween. In the mechanical seal according to the invention, the first seal ring or the second seal ring or, in particular, both seal rings are designed in the shape of the sliding member according to the invention, as described above. By forming one or even both seal rings of the mechanical seal in the shape of the gliding element according to the invention, high hardness and high modulus of elasticity may also be achieved in the mechanical seal according to the invention, even under high mechanical impact and high temperatures, thereby obtaining high abrasion resistance of the first and/or second seal ring while at the same time maintaining good sliding properties.

In addition, a bearing arrangement comprising at least one sliding member as disclosed above is also described according to the invention. The bearing arrangement may, for example, be in the form of a slide bearing or a rolling bearing. The design of a slide bearing is especially preferred, which in particular is a radial slide bearing or an axial slide bearing. One or both sliding members or one or both sliding surfaces of the sliding bearing are preferably designed according to a sliding member according to the invention. Such bearing arrangements are preferably used for pumps or magnetic couplings.

The bearing arrangement preferably comprises at least one outer raceway and one inner raceway, the rolling bearing additionally comprising rolling members. According to the invention, the outer raceway or the inner raceway or both raceways are designed in the form of the sliding member according to the invention, as disclosed above. If the bearing arrangement is a rolling bearing, one or more rolling members in the form of the sliding member according to the invention may be designed alternatively or in addition thereto. This allows very good abrasion resistance of the bearing arrangement to be achieved even at high temperatures and high mechanical impacts while providing very good sliding properties.

In addition, a holder, in especially of a spacecraft such as a satellite, is described according to the invention. Such holders or other components of the spacecraft have the advantage that the impact of temperature changes occurring in space have no negative effects on the component.

Still according to the invention, a method for the manufacture of a particulate support material coated with a graphene-containing material will be described. Due to its very good mechanical properties, the support material manufactured may especially be used to improve abrasion resistance of a ceramic component, such as the sliding surface of a seal ring or bearing arrangement, wherein the ceramic component has very good electrical conductivity, especially in the range of from $5.3 \times 10^{-3}$ to $5.3 \times 10^{-1}$ S/cm. The electrical conductivity can be determined especially by measuring electrical resistivity, e.g. using a Wheatstone measuring bridge.

The method first comprises a step of dispersing a particulate support material in a dispersant. Neither the particulate support material nor the dispersant are limited in detail. Especially, the particulate support material may be formed as mentioned above in relation to the sliding member according to the invention, and advantageously may comprise at least one ceramic material, and especially SiC for this purpose. As a dispersant, a medium is chosen in which the particulate support material may easily be distributed. For cost and environmental reasons, aqueous and/or alcoholic dispersants, and in particular ethanol-containing dispersants, are preferred. Dispersing may be carried out, for example, using ultrasound and/or a stirrer and/or homogenizer. Good distribution of the particles of the particulate support material in the dispersant is essential.

In another step, addition of a dopamine-containing carbon source is performed, especially from renewable feedstock. Herein, this compound is suitable to produce graphene-containing material when appropriately processed. In other words, the carbon source is a graphene precursor.

Subsequently, the dispersant will be removed while obtaining a solid substance. Common process steps may herein be applied, such as removal of the dispersant by temperature application, evaporation of the dispersant in a rotary evaporator or freeze drying. A solid substance will remain from the carbon source for the graphene-containing material to be formed and the particulate support material, wherein the carbon source is arranged on top of the particulate support material.

This is followed by a step of carbonizing the chemical compound. Carbonization is performed under temperature treatment such that graphene-containing material at least partially, and especially completely, covers the particulate support material. The thermal treatment required for this may be performed in a tube furnace, the temperature of which can easily be controlled.

Direct carbonization of graphene precursor arranged on a surface of the particulate support material produces a material bond between the support material and the graphene manufactured. The graphene-containing coating is thus permanently bonded to the particulate support material in a strong and stable manner, resulting in high abrasion resistance. The method is easy to perform, enabling manufacture of high yield particulate support material coated with graphene-containing material.

For environmental reasons and also as this carbon source is derived from renewable feedstock materials, the carbon source advantageously is selected from the group consisting of: dopamine or a mixture of dopamine and furfuryl alcohol and/or glucose. Moreover, these compounds easily form high yield of graphene under thermal treatment. Use of dopamine provides for high electrical conductivity of the ceramic component.

To increase yield of particulate support material coated with graphene-containing material, the solid substance obtained after removal of the dispersant is preferably comminuted before carbonization. Following comminution, the solid substance has a particle diameter of less than 1 mm and in particular less than 0.1 mm. Thus, temperature treatment may also be performed uniformly, while a graphene-containing coating layer is being formed.

A temperature process comprising at least two steps has been proven to be particularly advantageous for the formation of a graphene-containing coating of a particulate support material. Carbonization is especially carried out in a two-step temperature process under inert gas atmosphere, wherein in a first temperature step the solid substance is heated at 80 to 180° C. using a heating rate of 5° C./min and maintained at that temperature range for 15 to 25 hours, and in a second temperature step the solid substance is heated to 600 to 1500° C. using a heating rate of 5° C./min and is maintained at that temperature range for 4 to 8 hours. This allows almost complete conversion of the graphene precursor into graphene, so that the coating layer surrounding the particulate support material largely consists of graphene, with the exception of technically unavoidable residues.

In the following, advantageous further developments for the manufacture of particulate support material coated with graphene-containing material will be disclosed.

For the manufacture of graphene-coated SiC using dopamine (SiC:dopamine 90:10 wt. %) SiC (18 g) is dispersed in a solution of tris(hydroxymethyl) aminomethane (50 mL; 100 mmole/L in $H_2O$) using an ultrasonic bath (15 min). Followed by addition of a solution of dopamine (2.00 g) in tris(hydroxymethyl) aminomethane (50 mL; 100 mmole in $H_2O$). The reaction mixture is held at room temperature while stirring for another 72 h. Subsequently water is removed by freeze drying. The dried powder is carbonized (thermolyzed) in a tube furnace in an inert atmosphere ($N_2$). This is done by heating to 150° C. in steps of 5° C./min, holding for 21 h, then increasing to 1000° C. in steps of 5° C./min and thermolyzing for 5 h. Herein, the functionalized graphene is produced with dopamine as the carbon source in a template-mediated reaction, wherein SiC serves as a template. A homogeneous mixture of graphene and SiC is also obtained. Graphene coating strongly changes the specific surface (from 10 to 35 $m^2/g$), as measured by $N_2$ adsorption using a BET method with a Sorptomatic 1990 (Protec Hofheim) to determine the mass-related specific surface area of a sample by detecting the amount of nitrogen adsorbed onto the sample surface, as well as the color of the SiC. The product has a graphene content of 5.2% by weight. Coating with graphene yields electrical resistivity of $5.3 \times 10^{-2}$ S/cm.

Alternatively, for the manufacture of graphene-coated SiC using dopamine (SiC; glucose=80:20% by weight), SiC (16 g) is dispersed in a solution of tris(hydroxymethyl) aminomethane (50 mL; 100 mmole/L in $H_2O$) using an ultrasonic bath (15 min). Subsequently, a solution of dopamine (4.00 g) in a solution of tris(hydroxymethyl) aminomethane (50 mL; 100 mmole/L in $H_2O$) is added. The reaction mixture is kept at 60° C. for another 96 h while stirring. Water is then removed by freeze-drying. Following comminution, the dried powder is carbonized in a tube furnace in an inert atmosphere ($N_2$). This is done by heating in steps of 5° C./min up to 150° C., holding for 21 h, then increasing to 1000° C. in steps of 5° C./min and thermolyzing for 5 h. The product has a graphene content of 8.4% by weight and a specific surface area of 66 $m^2/g$, as measured by $N_2$ adsorption using a BET method with a Sorptomatic 1990 (Protec Hofheim) to determine the mass-related specific surface area of a sample by detecting the amount of nitrogen adsorbed onto the sample surface.

The two previous example embodiments using dopamine as a carbon source show significantly higher electrical conductivity and electrical resistivity in the range of 1 to 100 Ωcm (at room temperature). Coating with graphene based on dopamine result in high increase of conductivity to $5.3 \times 10^{-2}$ S/cm. This high electrical conductivity allows sintering of the SiC-graphene nanocomposite using the SPS/FAST process (Spark Plasma Sintering/Field Activated Sintering). This allows realization of significantly faster sintering cycles with improved material properties and complete compaction. If the product is electrically conductive, the friction behavior under tribological impact may also be specifically adjusted by changing the electrical potential in the ambient medium. The increased electrical conductivity of the nanocomposite also allows use of innovative machining processes such as electrical discharge machining.

Furthermore, the two example embodiments described using dopamine as a carbon source show significantly improved fracture toughness than that of a ceramic component made exclusively of the particulate support material, especially SiC. For example, a component made exclusively of SiC as a particulate support material has a fracture toughness of 3.00 Mpa $\sqrt{m}$. A component made of a mixture of SiC (particulate support material) and particulate support material coated with graphene has a fracture toughness of 3.70 MPa $\sqrt{m}$ at a percentage of 98% SiC by weight and 2% by weight of graphene-coated SiC. A component containing 96% by weight of SiC and 4% by weight of graphene-coated SiC has a fracture toughness of 3.72 MPa $\sqrt{m}$. Those experimental values illustrate that addition of graphene-coated particulate support material to a particulate support material can significantly increase fracture toughness of such a ceramic component, especially by 10% or more. It should be noted that in all experiments fracture toughness was measured using the SEVNB method. Thus, in addition to improved electrical conductivity, the ceramic component according to the invention also exhibits increased fracture toughness, compared to ceramic components without graphene-coated particulate support material in the component. Even relatively small quantities, preferably between 1 and 10% by weight, of graphene-coated particulate support material in the ceramic component are sufficient to achieve the improved properties with regard to electrical conductivity and fracture toughness.

Furthermore, according to the invention, a method for the manufacture of a ceramic component is also described. The method thus is also applicable for the manufacture of a ceramic component, a bearing arrangement and a slide ring, as used in the mechanical seal described above, as well as spacecraft holder. Therefore, additional reference is made to the sliding member according to the invention, as set forth above, with regard to the advantages, advantageous effects and further developments.

In the process according to the invention, a ceramic component, e.g. a sliding member, is manufactured which comprises a sliding surface, which is specifically designed. For this, a mixture is produced in one step which comprises a particulate support material and a particulate support material at least partially, especially completely coated with a graphene-containing material. The particulate support material coated with a graphene-containing material is obtainable, for example, by the process described above for the manufacture of a particulate support material coated with a graphene-containing material. Mixing can be performed in a conventional manner, for example using a stirrer and/or homogenizer and/or ultrasound.

The mixture itself may be formed as a sliding member, but may as well be applied, for example, to a base body especially consisting of the particulate support material, then only forming a sliding surface of the sliding member.

In another step, a sintering procedure of the mixture is added, creating a material bond, a sinter bond between the particulate support material and the support material coated with graphene-containing material. Specifically, a pore-free sliding surface is produced in the sintering procedure. A sliding member produced by the method according to the invention is characterized by high stability and abrasion resistance, even under high mechanical and/or thermal impacts, in a simple and thus also cost-effective manufacturing process.

For the sake of improving hardness of the surface of the ceramic component, especially the sliding surface, the particulate support material is advantageously selected from ceramic material, especially among the group consisting of: SiC, WC, $B_4C$, BN, $Si_3N_4$, $Al_2O_3$, MgO, $ZrO_2$ and any mixtures thereof, and especially consisting of SiC.

For further cost reduction while maintaining high stability in the sliding member, the mixture is applied to a base body, the base body especially consisting of a ceramic material, especially selected from the group consisting of: SiC, WC, $B_4C$, BN, $Si_3N_4$, $Al_2O_3$, MgO, $ZrO_2$ and any mixtures thereof, and especially SiC.

In the following, preferred example embodiments of the invention will be described in detail while making reference to the accompanying drawing. In the drawing, equal or functionally equal parts are identified with the same reference numbers, wherein:

FIG. 6 is a schematic representation of a method for the manufacture of particulate support material coated with graphene-containing material according to an embodiment of the invention;

FIG. 7 is a schematic representation of a method for the manufacture of a sliding member according to an embodiment of the invention.

The present invention is described in detail by example embodiments. The figures only show the essential features of the present invention, all other features are omitted for the sake of clarity. Furthermore, equal reference numbers identify equal members.

Figure 1:
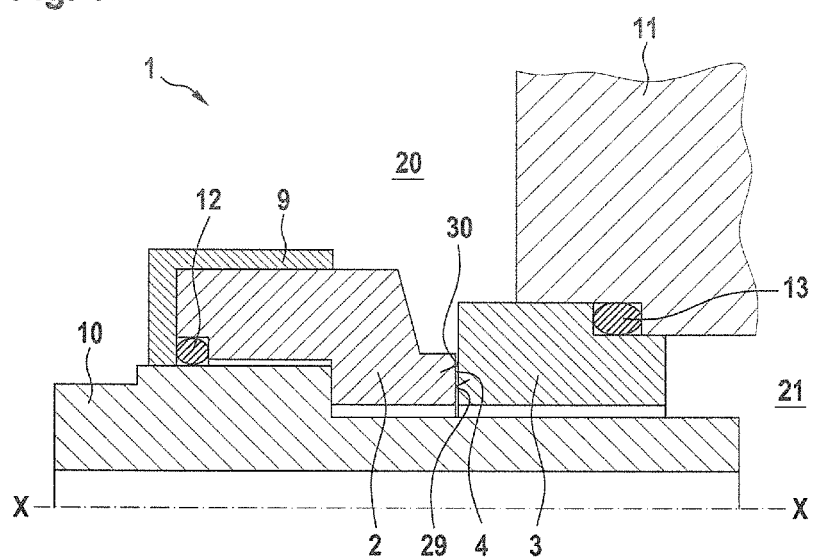
FIG. 1 is a schematic sectional view of a mechanical seal according to a first example embodiment of the invention.

FIG. 1 schematically shows a ceramic component formed as a mechanical seal arrangement 1 comprising a rotating slide ring 2 having a first sliding surface 29, and a stationary slide ring 3 having a second sliding surface 30. A sealing gap 4 is defined between the two slide rings 2, 3 in a known manner. The rotating seal ring 2 is connected to a rotating component 10, such as a shaft sleeve or the like, via a driving member 9. The reference numbers 12 and 13 identify O-rings. The stationary seal ring 3 is connected to a stationary component 11, such as a housing or the like.

The mechanical seal arrangement 1 seals a product area 20 from an atmosphere area 21.

Figure 2:
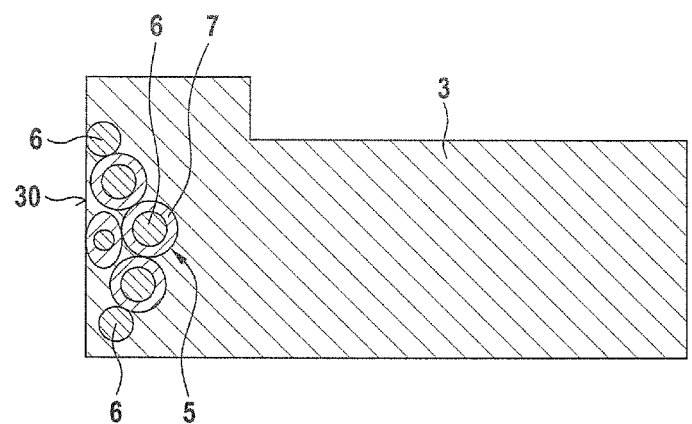
FIG. 2 is a schematic sectional view of the second slide ring shown in FIG. 1.

Within the scope of the invention, the stationary slide ring 3 is to be regarded as a sliding member and is shown in detail in FIG. 2. The stationary slide ring 3 includes the second sliding surface 30. The second sliding surface 30 is made of a sintered material comprising a particulate support material 6 and a graphene containing material 7. The particulate support material 6 is at least partially coated with the graphene-containing material 7, such that the graphene-containing material 7 at least sectionally surrounds a surface of the particulate support material 6. In FIG. 2, the graphene-containing material 7 is exemplified as completely surrounding the particulate support material 6, but this is not essential.

As it may also be seen in FIG. 2, the second sliding surface 30 not only comprises a support material 5 coated with graphene-containing material, but also comprises particulate support material 6 not coated with graphene-containing material. In other words, the second sliding surface 30 comprises a mixture of particulate support material 6 and particulate support material 5 coated with graphene-containing material.

Herein, a mass ratio of particulate support material 6 and particulate support material 5 coated with graphene-containing material advantageously is 80:20 to 99.5:0.5 and especially 90:10 to 99.5:0.5.

In the embodiment shown, the particulate support material 6 consists of a ceramic material, especially selected from the group consisting of: SiC, WC, $B_4C$, BN, $Si_3N_4$, $Al_2O_3$, MgO, $ZrO_2$ and any mixtures thereof. SiC is particularly preferred because of good processability, excellent mechanical properties and also because of reasonable price thereof. The particulate support material 6 is in the form of ceramic grains.

Figure 5:
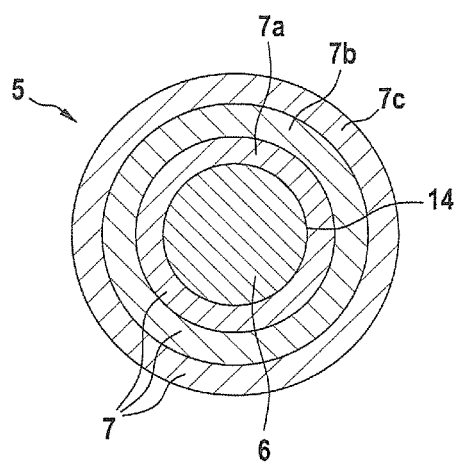
FIG. 5 is a schematic sectional view of a particulate support material coated with graphene-containing material of the stationary slide ring shown in FIG. 2.

Using ceramic particulate support material 6 still has another advantage, which may clearly be seen in FIG. 5: for example, a material bond 14 may easily be formed between the particulate support material 6 and the graphene-containing material 7, through which bond the graphene-containing material 7 is firmly bonded to the surface of the particulate support material 6. In this case, it is especially a sinter bond characterized by high stability, thus increasing abrasion resistance.

As a carbon source containing dopamine was used, excellent electrical conductivity of approx. $5.3\times10^{-2}$ S/cm and at the same time high fracture toughness, especially greater than 5 MPa $\sqrt{m}$, is achieved at room temperature.

Analogously, the above-mentioned explications may as well be applied to the rotating mechanical seal 2, thus increasing the effects achieved by the invention.

Figure 3:
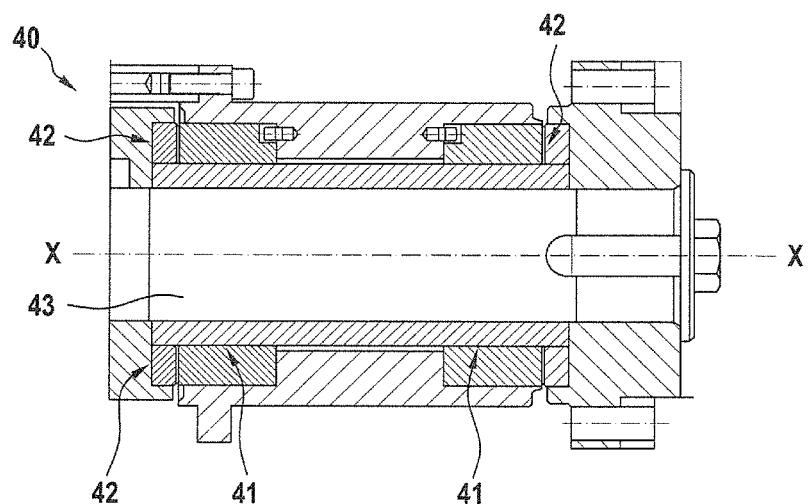
FIG. 3 is a schematic longitudinal view of a bearing arrangement according to a second example embodiment of the invention.
Figure 4:
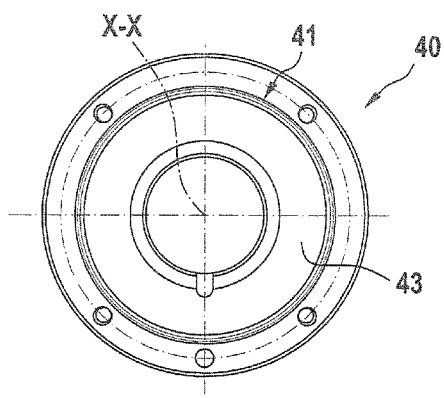
FIG. 4 is a cross-section of the bearing arrangement shown in FIG. 3.

FIG. 3 shows a bearing arrangement 40 in longitudinal section. The bearing arrangement 40 is designed as a slide bearing and comprises two radial slide bearings 41 and one axial slide bearing 42, which support a shaft 43. For the sake of completeness, FIG. 4 shows the same bearing arrangement 40 in cross-section. At least one of the slide bearings 41, 42 shown comprises a sliding surface formed from a sintered material comprising a particulate support material and a graphene-containing material as is disclosed by way of example for the stationary slide ring in FIG. 2. The particulate support material is at least partially surrounded by the graphene-containing material, such that the graphene-containing material at least sectionally surrounds a surface of the particulate support material.

Moreover, as it may be seen from FIG. 5, the graphene-containing material 7, which especially consists of graphene except for technically unavoidable residues, surrounds the particulate support material 6 in the form of individual layers 7a, 7b, 7c, which are arranged on top of each other. The graphene-containing coating may advantageously comprise a coating of up to 100 layers, especially a coating of up to 20 layers and especially a coating of up to twelve layers of graphene-containing material 7. Thus, a content of graphene in the particulate support material 5 coated with graphene-containing material may specifically be controlled, as may the abrasion resistance.

The use of particulate support material 5 coated with graphene-containing material allows for the manufacture of a ceramic component, especially a sliding member, such as a mechanical seal or bearing arrangement, having excellent hardness, high modulus of elasticity and excellent abrasion resistance, while, at the same time, also having excellent tribological properties, good electrical conductivity and high fracture toughness.

FIG. 6 shows a schematic course of the procedure in the manufacture of particulate support material 5 coated with graphene-containing material, as shown, for example, in FIG. 5. First, in step 100, a particulate support material 6 is dispersed in a dispersant 17. In the embodiment shown herein, SiC is used as a particulate support material 6. An aqueous solution, pure water or an alcoholic solution may advantageously be used as a dispersant 17. Dispersing is performed such that, after dispersion, the particulate support material 6 is distributed in the dispersant 17 in the form of individual particles. Herein use of a stirrer and/or a homogenizer and/or ultrasound may be of advantage.

In step 200, a carbon source 15 is added, specifically a carbonaceous compound advantageously selected from the group consisting of: dopamine or mixtures of dopamine and furfuryl alcohol and/or glucose, as these carbon sources are formed from renewable feedstock. The carbon source 15 is a precursor of the graphene-containing material to be produced.

Subsequently, in step 300, the dispersant 17 is removed to obtain a solid substance 16, which may very easily be performed, for example, by evaporating the dispersant 17 in a rotary evaporator, freeze-drying and the like. Drying will be continued until the weight of the solid substance 16 remains constant.

Now, the solid substance 16 obtained comprises the particulate support material 6 and the graphene precursor arranged on a surface of the particulate support material 6. The solid substance 16 may be processed further as it is, but in step 400, is first comminuted and then carbonized. In other words, the carbon source 15 is thermally treated such that the graphene-containing material 7, at least partially, especially completely, covers the particulate support material 6. Carbonization especially is done under an inert gas atmosphere, such as nitrogen. However, other inert gases are also conceivable.

In a first temperature step, the solid substance 16 is heated to 80 to 180° C. at a heating rate of 5° C./min and will be held at that temperature range for 15 to 25 hours, and in a second temperature step, the solid substance 16 is heated to 600 to 1500° C. at a heating rate of 5° C./min and is held at that temperature range for 4 to 8 hours.

A particulate support material 5 coated with graphene-containing material is obtained, wherein the graphene-containing material 7 coats the particulate support material 6 in the form of individual layers, i.e. at least one layer and advantageously up to 100 layers, especially advantageously up to 20 layers and especially advantageously up to 12 layers.

FIG. 7 shows a schematic representation of a method for the manufacture of a sliding member according to an embodiment of the invention, which is exemplified in the form of a slide ring 3. In process step 500, a mixture of a particulate support material 6 and a particulate support material 5 at least partially, especially completely, coated with a graphene-containing material is first produced. The particulate support material 6 especially is a ceramic material, preferably selected from the group consisting of: SiC, WC, $B_4C$, BN, $Si_3N_4$, $Al_2O_3$, MgO, $ZrO_2$ and any mixtures thereof, and especially SiC. Mixing especially may be performed as dry mixing. Subsequently, the resulting mixture is sintered in process step 600. The sintering process produces a slide ring 3 characterized by a pore-free sinter material, thus significantly increasing the density of the slide ring 3 and also increasing the abrasion volume. The slide ring 3 produced in this way is characterized by excellent stability, even under heavy mechanical and/or thermal impacts.

As it is further shown in FIG. 7, the mixture obtained in step 500 above may be applied to a base body 8, the base body 8 also being especially made of a ceramic material, especially selected from the group consisting of: SiC, WC, $B_4C$, BN, $Si_3N_4$, $Al_2O_3$, MgO, $ZrO_2$ and any mixtures thereof, and especially SiC. This allows material costs to be saved while maintaining good quality.

LIST OF REFERENCE NUMBERS 1 mechanical seal arrangement
2 rotating slide ring
3 stationary slide ring
4 sealing gap 5 particulate support material coated with a graphene-containing material
6 particulate support material
7 graphene-containing material
8 base body
9 driving member
10 rotating component
11 housing
12, 13 seal rings
14 material bond
15 carbon source
16 solid substance
17 dispersant
20 product area
21 atmosphere area
29 first sliding surface
30 second sliding surface
31 rear surface
40 bearing arrangement
41 radial slide bearing
42 axial slide bearing
43 shaft
X-X axial direction
100-600 process steps

The invention claimed is:

1. A ceramic component comprising: a particulate support material and a graphene-containing material, wherein the particulate support material is at least partially, coated with the graphene-containing material, a material bond is present between the particulate support material and the graphene-containing material, and said ceramic member has an electrical resistivity of from 1 $\Omega$cm to 100 $\Omega$cm at room temperature, further comprising a first base body, said first base body exclusively comprising said particulate support material.

2. The ceramic component according to claim 1, wherein the particulate support material is completely coated with the graphene-containing material.

3. The ceramic component according to claim 1, wherein the ceramic component consists of a mixture of particulate support material and particulate support material coated with graphene-containing material.

4. The ceramic component according to claim 3, wherein a mass ratio of particulate support material and particulate support material coated with graphene-containing material is 80:20 to 99.5:0.5.

5. The ceramic component according to claim 1, wherein the particulate support material consists of a ceramic material, wherein the ceramic material is selected from the group consisting of: SiC, WC, $B_4C$, BN, $Si_3N_4$, $Al_2O_3$, MgO, $ZrO_2$ and mixtures thereof.

6. The ceramic component according to claim 1, the graphene-containing sheathing comprising one layer up to 100 layers of graphene-containing material.

7. The ceramic component according to claim 1, the ceramic component having 6 to 8% by volume of macropores in relation to the total volume of the ceramic component.

8. A sliding member, comprising a first sliding surface, which sliding member being a ceramic component according to claim 1.

9. A mechanical seal comprising: a rotating first slide ring having a first sliding surface and a stationary second slide ring having a second sliding surface defining a sealing gap therebetween, the first slide ring and/or the second slide ring being a sliding member according to claim 8.

10. A bearing arrangement, especially a plain bearing or roller bearing, especially a radial plain bearing or axial plain bearing, comprising at least one sliding member according to claim 8.

11. A holder for a space craft which is a ceramic component according to claim 1.

12. The ceramic component according to claim 4, wherein a mass ratio of particulate support material and particulate support material coated with graphene-containing material is especially 90:10 to 99.5:0.5.

13. The ceramic component according to claim 1, wherein the particulate support material consists of SiC, and/or the graphene-containing sheathing layers having one layer up to 20 layers having graphene-containing material, or the graphene-containing sheathing layers having one layer up to twelve layers of graphene-containing material.

* * * * *